United States Patent [19]
Sienerth et al.

[11] Patent Number: 5,975,155
[45] Date of Patent: Nov. 2, 1999

[54] MULTI-CONTAINER FILLER

[75] Inventors: Richard P. Sienerth, Erie; John E. Zarycki, North East; Michael J. Melaragno, Erie, all of Pa.

[73] Assignee: Renold, Inc., Westfield, N.Y.

[21] Appl. No.: 08/994,226

[22] Filed: Dec. 19, 1997

[51] Int. Cl.[6] .................................................. B65B 1/00
[52] U.S. Cl. .......................... 141/84; 141/165; 141/166; 141/181; 141/284; 141/287; 141/314; 141/383
[58] Field of Search .................................. 141/10, 84, 165, 141/166, 181, 182, 284, 287, 313–317, 383, 71–75, 80; 53/570

[56] References Cited

U.S. PATENT DOCUMENTS

| | | | |
|---|---|---|---|
| 2,778,387 | 1/1957 | Diehl | 141/84 |
| 4,182,386 | 1/1980 | Alack | 141/314 |
| 4,676,284 | 6/1987 | DeCrane | 141/114 |
| 4,825,913 | 5/1989 | Stott | 141/287 |
| 4,854,353 | 8/1989 | Russell | 141/74 |
| 5,036,893 | 8/1991 | DeCrane | 141/114 |
| 5,056,571 | 10/1991 | Derby | 141/10 |
| 5,165,455 | 11/1992 | De Crane | 141/10 |
| 5,191,920 | 3/1993 | McGregor | 141/313 |
| 5,259,425 | 11/1993 | Johnson et al. | 141/10 |
| 5,348,063 | 9/1994 | Handleman | 141/314 |
| 5,400,837 | 3/1995 | Kelley et al. | 141/10 |
| 5,787,945 | 8/1998 | Riemersma | 141/314 |
| 5,810,060 | 9/1998 | Bolz et al. | 141/287 |

FOREIGN PATENT DOCUMENTS

| | | | |
|---|---|---|---|
| 627480 | 9/1961 | Canada | 239/220 |

*Primary Examiner*—J. Casimer Jacyna
*Attorney, Agent, or Firm*—Lovercheck and Lovercheck

[57] ABSTRACT

A container filling machine having a frame and a fill station on the frame. The fill station has hooks to engage stirrups on the top of the bag. The fill station also has a platform to support a first open topped container. The fill station also has hooks to support a first open top container. A filling member is supported on the hooks for supporting an open top container. A dispensing means is supported on the frame of the open top container to fill the top container and to fill a container resting on the platform. Means is provided to automatically release the hooks and means is provided to shake the bag to settle the material in it and to move the bags towards the front of the machine. Hooks are used to facilitate removing the bag.

6 Claims, 7 Drawing Sheets

MULTI-CONTAINER FILLER

BACKGROUND OF THE INVENTION

This invention relates generally to container filler machines and more particularly to a filler machine that will fill either drums or bags without any change or adjustment of the filling mechanism. Applicant is aware of the following prior art U.S. Pat. Nos. 4,182,386; 4,519,426; 4,676,284; 4,688,371; 4,703,782; and, 5,036,893.

SUMMARY OF THE INVENTION

The machine has several major features that are:

A drum head filling/sealing mechanism—This mechanism has been designed to allow fill stations the flexibility to fill drums as well as bags without requiring tools for a change over. It also allows the creation of a dust tight filling zone. This is achieved by sliding the drum head adapter over the inflatable neck seal which creates a dust tight seal between the inside diameter of the adapter and the outer edge of the inflatable bladder. This operation coupled with the three piece spout design that has a flexible section, and a pair of actuators allows the creation of the seal to the top of the drum. This mechanism as described also allows the filling of multiple size drums with varying heights and diameters.

Automatic bag release mechanism—This mechanism allows automatic release of the hanging stirrups of a full or partially full bag. This device is unique in the industry because it uses an individual actuator on each assembly to create the motion required to pull the hook backwards and release the bag stirrup. The system incorporates the use of four these individual assemblies. The use of the assemblies coupled with our custom designed adjustable arms allows for adjustment within the confines of the overall system. Giving the user maximum adjustability for varying bag sizes. The assemblies also have lock down knobs which allow for the assemblies to be fixed after adjustment.

The hook has been specially designed to allow for maximum holding area while having specially designed curves that allow for the release of the bag stirrup, under load.

Rear to front traversing hooks—This component of our system allows for the rear bag hanging assemblies (consisting of the hook, release actuator and housing) to move forward. This serves two purposes: (a) The operator no longer has to step on the machine to hang the rear bag stirrups on the assembly which creates a much safer working atmosphere; and, (b) Betters the efficiency of the fill process. This is accomplished by modifying the standard hook assembly and, attaching an actuator. This actuator is mounted above the mechanism with mounting brackets being located on each end. When this actuator receives a signal to index, the rear hooks forward the rear hook assemblies individually index forward and, the reverse happens when indexing back.

Sequence of operation—The machine incorporates a unique sequence. This is that during the fill cycle, the bag is lifted and lowered while filling to vibrate it. This creates a superior package at the end of the fill cycle. The number of lifts and lowers varies depending on product and process. The lifting is accomplished by using a single lifting device located in the rear of the machine. This lifting mechanism serves two purposes: (a) It allows the system to function as explained above; and, (b) It gives the system another adjustment necessary for the system to fill multiple containers.

A dual pressure solenoid system is used for isolating. The vibratory tables are used for vibration and, since it requires different air pressure to properly inflate the air mounts under different loading conditions, the dual pressure solenoid system is used.

This system utilizes solenoids and valves ported in such a way that the system is able to change the pneumatic or hydraulic pressure needed to properly suspend the load. This allows the flexibility to accommodate densifying containers with significantly different target weights.

Applicant is aware of the following U.S. Pat. Nos.: 4,676,284 to DeCrane and 5,036,893 to DeCrane.

It is an object of the present invention to provide an improved bag and drum filling machine.

Another object of the present invention is to provide a filling machine that is simple in construction, economical to manufacture and simple and efficient to use.

Another object of the present invention is to provide a filling machine that will fill either drums or bags without the alteration of the machine.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
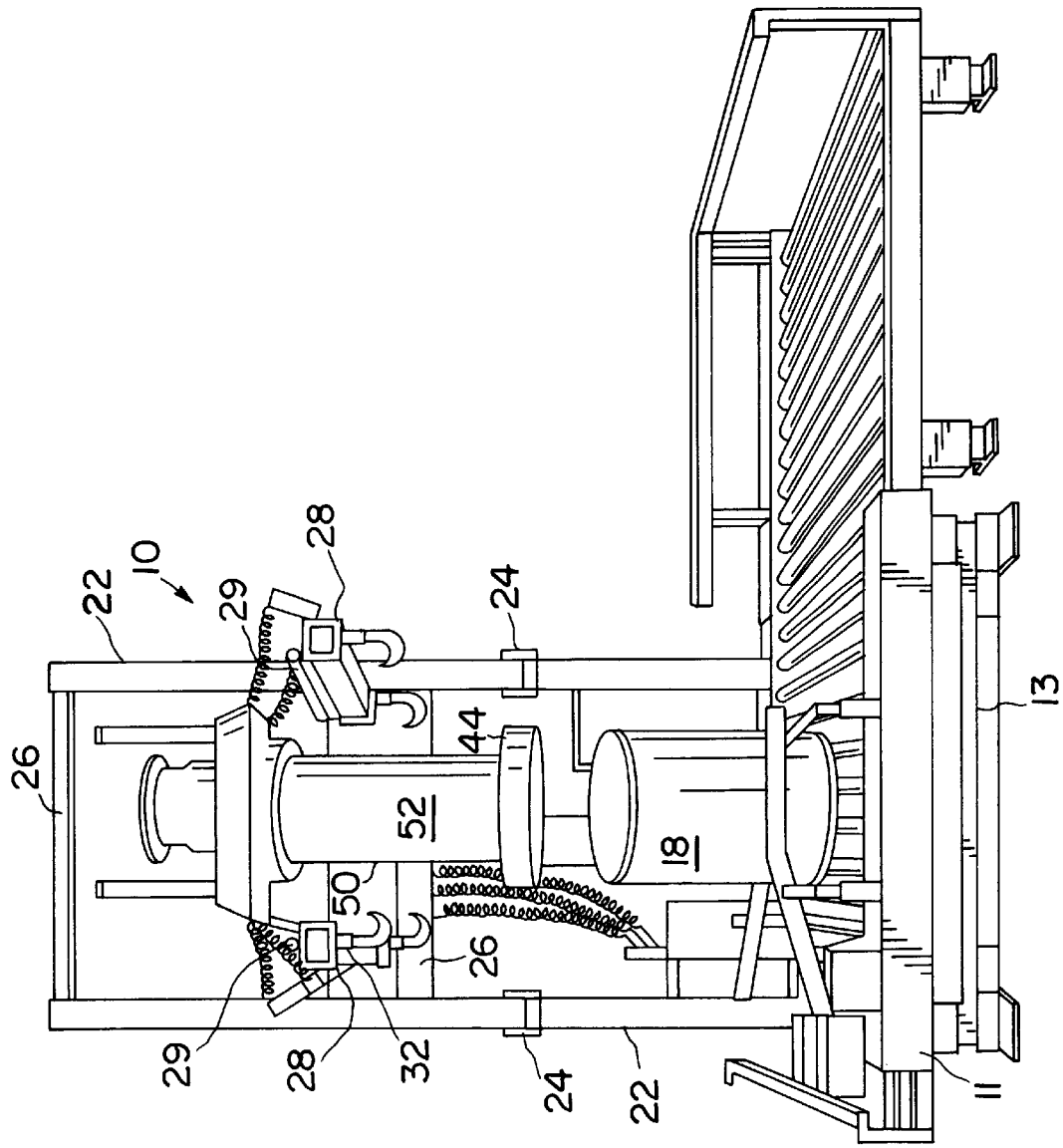
FIG. 1 shows a front isometric view of the machine in accordance with the invention with a drum in position for filling.
Figure 2:
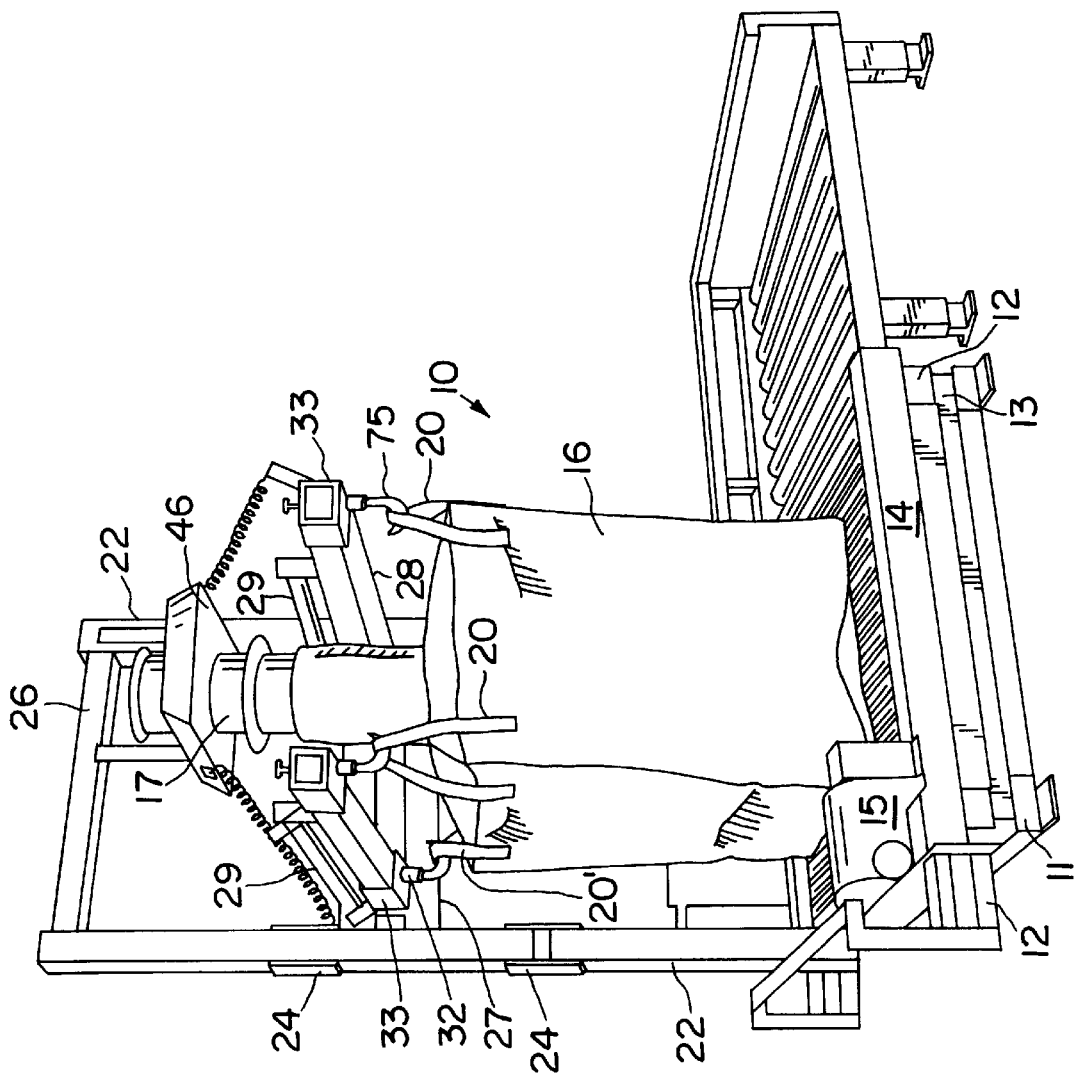
FIG. 2 shows a front view of the machine in accordance with the invention with a bag in position for filling.
Figure 3:
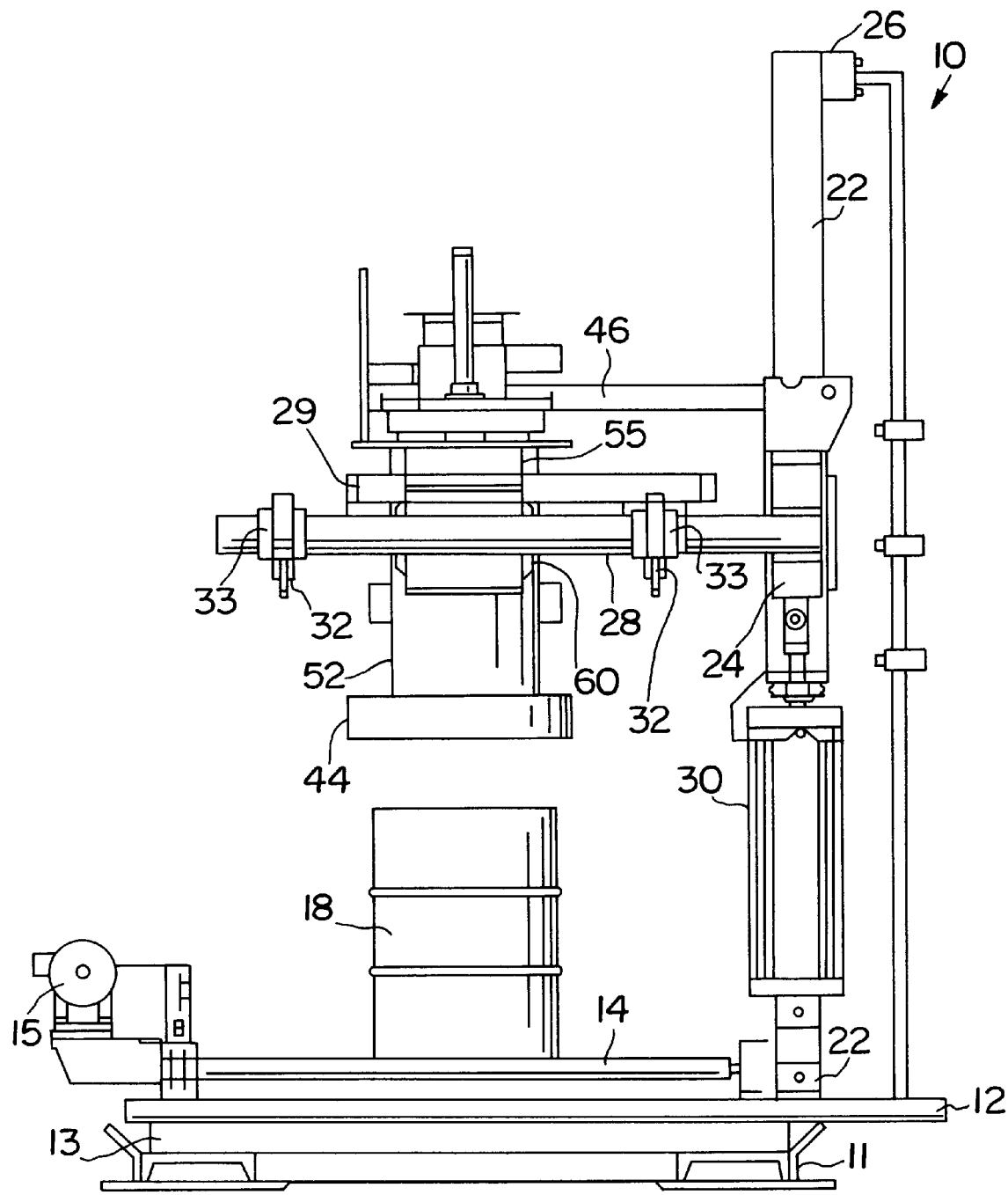
FIG. 3 is a side view of the machine shown in FIG. 1 with the drum in place showing certain parts.
Figure 4:
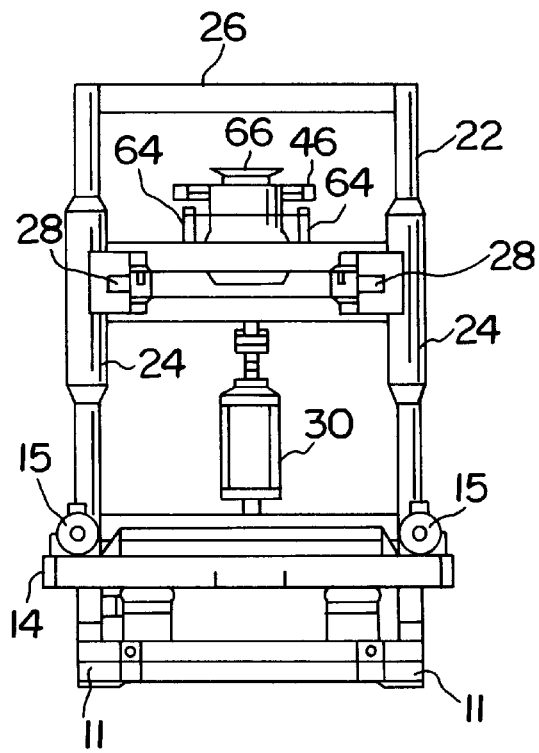
FIG. 4 is a front view of the machine shown in FIGS. 1–3.
Figure 5:
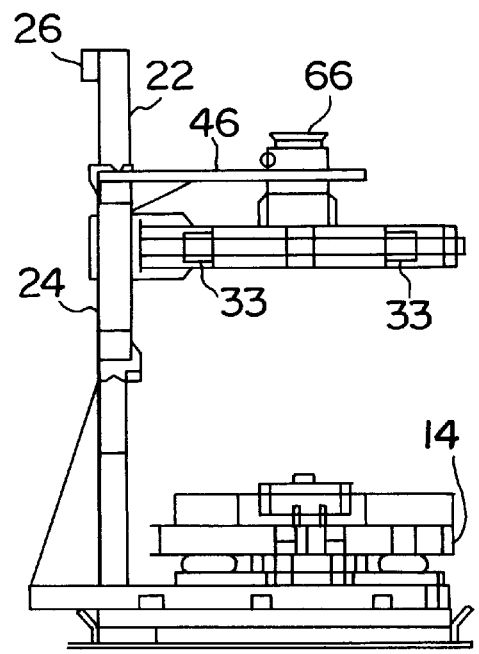
FIG. 5 is a side view of the machine shown in FIGS. 1–4.
Figure 6:
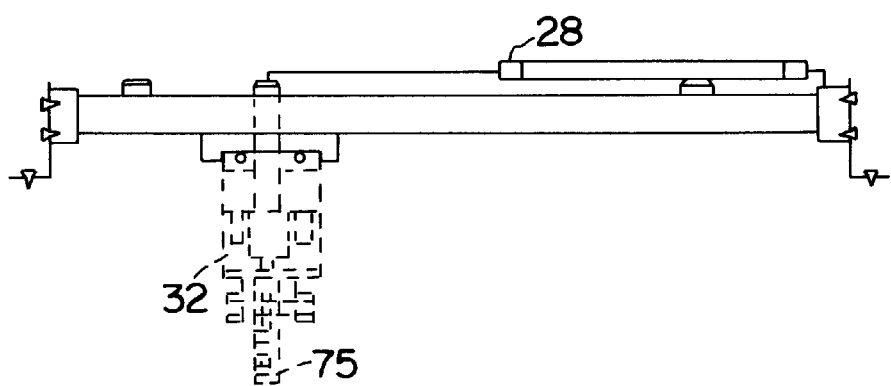
FIG. 6 is a side view of the moving means for the bag supports.
Figure 7:
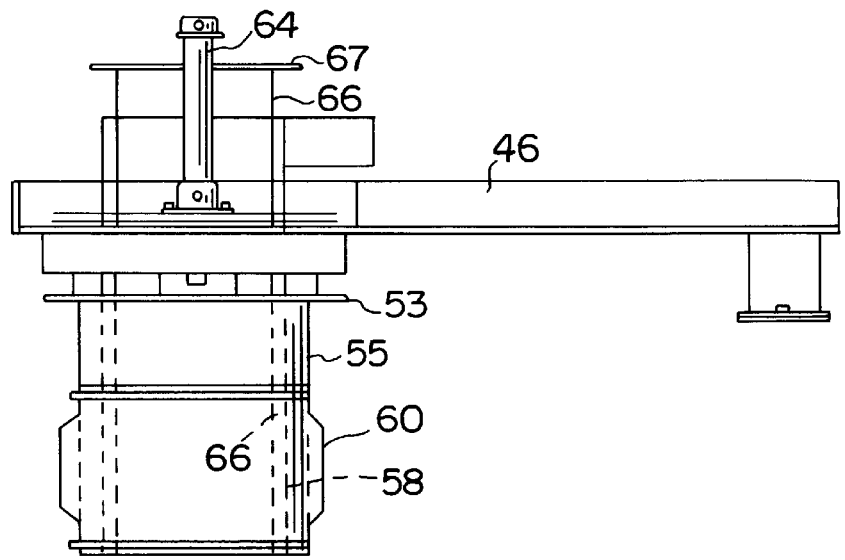
FIG. 7 is a front view of the fill spout assembly.
Figure 8:
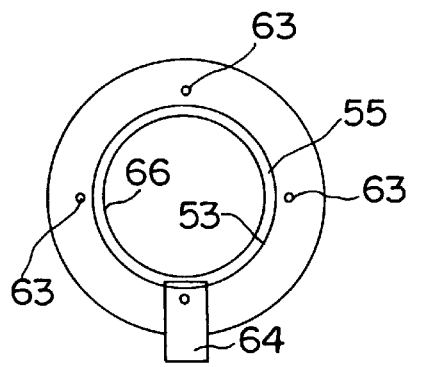
FIG. 8 is a side view of the spout support of FIG. 7.
Figure 10:
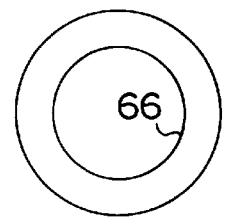
FIG. 10 is a top view of the intermediate cylinder of the three piece spout.
Figure 9:
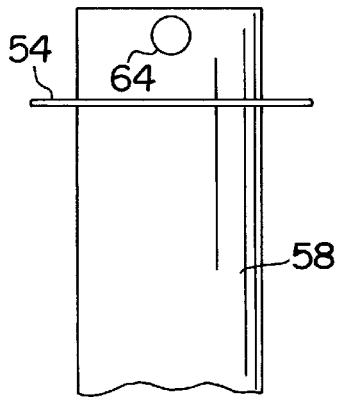
FIG. 9 is a top view of the intermediate cylinder of the fill spout.
Figure 11:
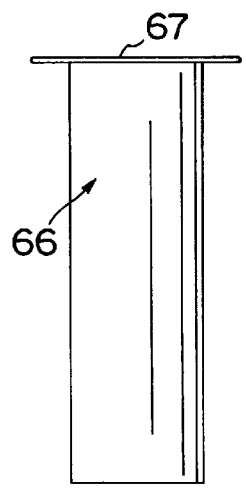
FIG. 11 is a side view of the bag carrier.
Figure 12:
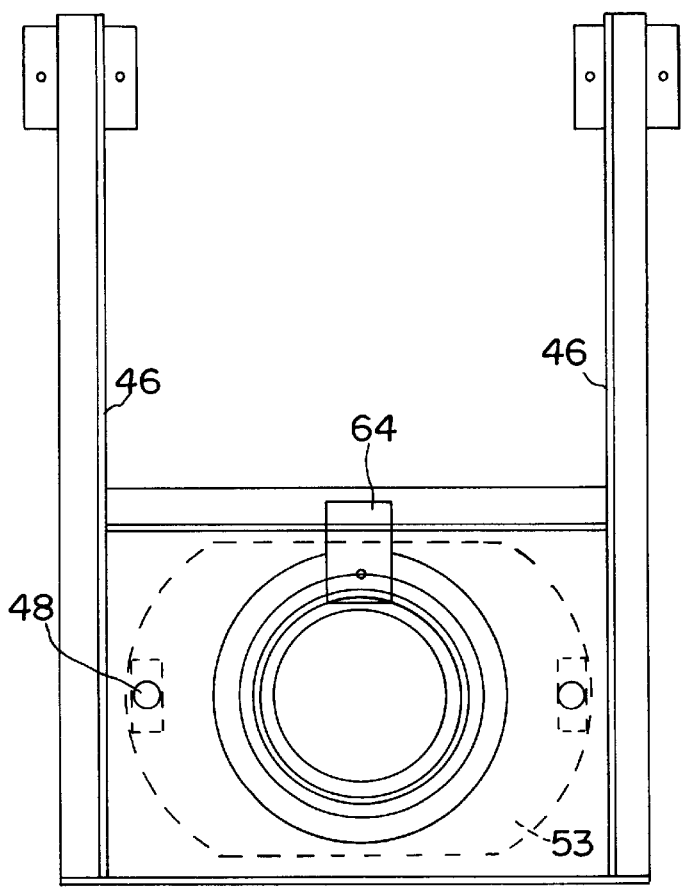
FIG. 12 is a top view of the spout.
Figure 14:
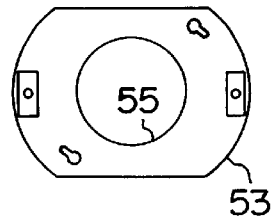
FIG. 14 is an enlarged partial side view of FIG. 16 of the outer cylinder of the spout assembly.
Figure 15:
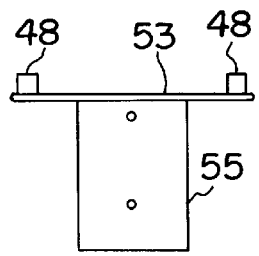
FIG. 15 is a top view of FIG. 14.
Figure 13:
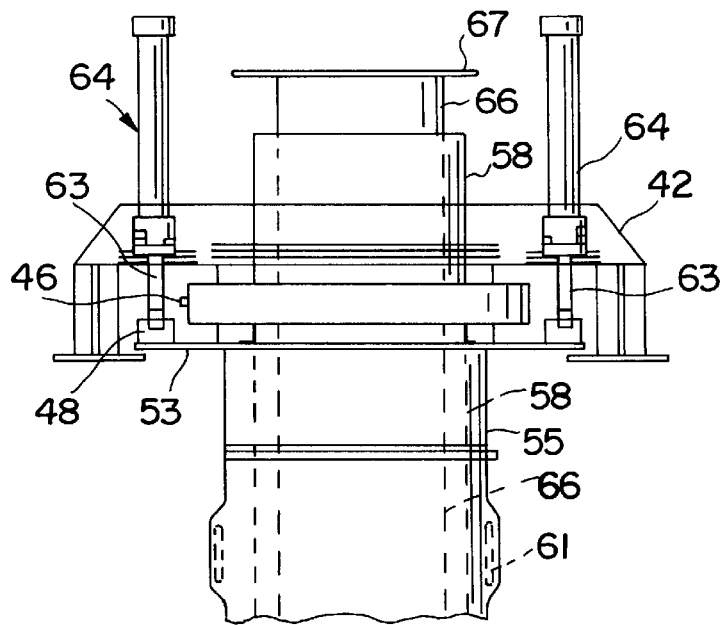
FIG. 13 is a front view of the fill spout assembly.
Figure 16:
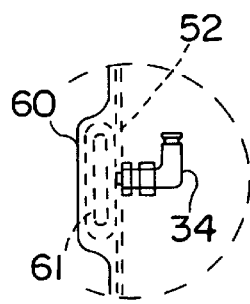
FIG. 16 is a partial front view of the inflatable drum cover.

Now with more particular reference to the drawings, machine 10 is shown in FIGS. 1 through 3. Machine 10 has fixed frame 11, platform 14 rests on frame 11, in which bag 16 or drum 18 can rest. Bag 16 has stirrups 20 fixed to it at spaced portions around its open end. Frame 11 has vertically extending posts 22 and telescopically slidable vertical members 24 are slidably supported on posts 22 and are connected together by cross member 26.

Arms 28 are fixed to said cross member 26 and moved up and down by a pneumatic cylinder 30. Bag supports 32 are supported on arms 28 by loops 33. Loops 33 carry bag supports 32 that are moved in and out by traverse cylinder 29.

Figure 19:
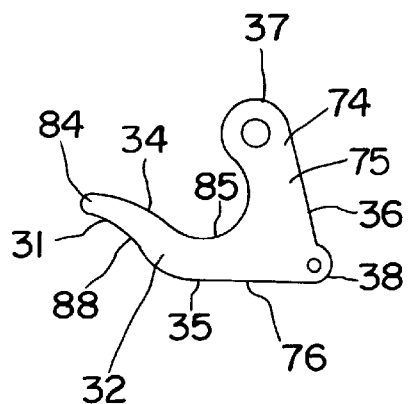
FIG. 19 is a side view of the hook of FIGS. 17 and 18.

Bag supports 32 may be hooks 75. Hooks 75 have first leg 31, upper edge 34, lower edge 35, first corner 37, second corner 38, base 74, end point 84 and concave surface 88 between end point 84 and second leg 36, all as shown in FIG. 19.

Container cover 44 is attached to outer cylinder 58 carried by arms 21 are lowered to rest on the upper edge of drum 16. Sliding drum head 52 is supported on frame 46 and overlies inflatable neck seal 60 and is attached to cylinder 52 of spout 50.

Hooks 32 may be connected to front stirrups 20 and rear stirrups 20' can be moved away from the front stirrups by means of pneumatic traverse cylinder 62 that controls piston rods 63 attached to hooks 75. The material is delivered to bag 61 through duct work connected to inner cylinder 41 of three piece spout 50.

When a bag is supported on bag supports 32, bags 16 can be raised up and down by means of the pneumatic cylinder 30 which raises and lowers arms 28 and hooks 75 of a valve arrangement such as shown in FIG. 3.

A three-piece spout 50 is made up of outer cylinder 55 having flange 53 connected to piston rod 63 of cylinder 64. Intermediate cylinder 58 with flange 61 attached to frame 21 and inner cylindrical member 66 having flange 67. Inflatable seal 60 is supported on outer cylindrical member 55.

This mechanism has been designed to allow a fill station of flexibility to fill drums as well as to fill bags.

Figure 17:
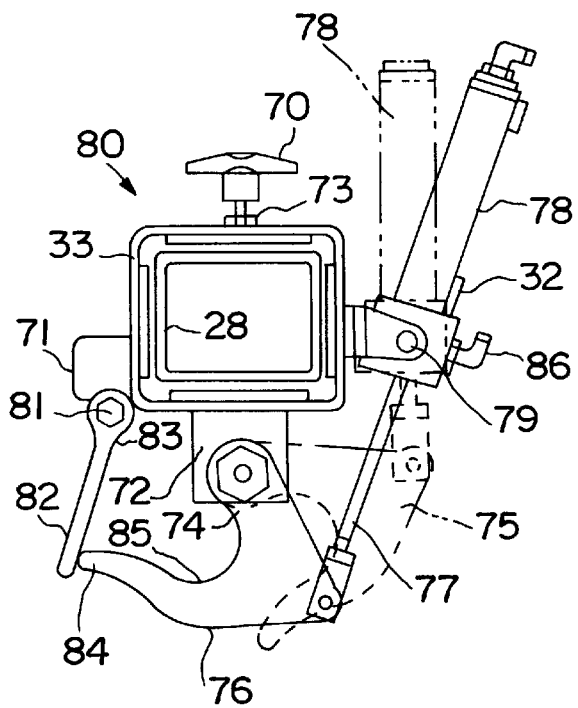
FIG. 17 is a side view of a FIG. 16.
Figure 18:
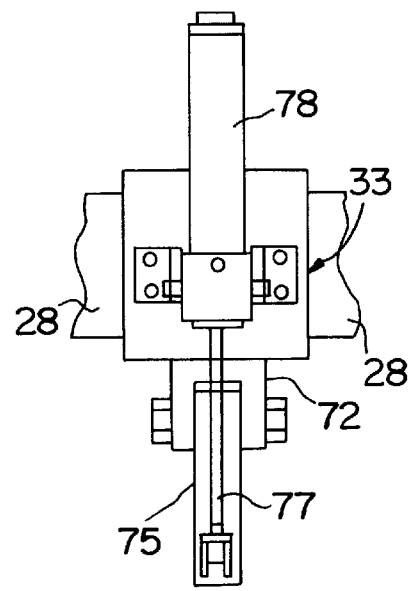
FIG. 18 is a side view of FIG. 17.

Bag supports 32 are shown in FIGS. 17–19. Each bag support 32 is made up of loop 33 slidably supported on one of arms 28 of movable frame 13.

Lugs 71,72,73 are fixed to each loop 33. Base 74 of hook 75 is pivotally attached to second leg 72. Bottom 76 of hook 75 is pivoted to piston rod 77. Piston rod 77 is received in each cylinder 78. Cylinder 78 is swingably attached to lug 73 at 79. Keeper 82 is pivoted to loop 33 at 81 and spring 83 urges keeper 82 toward hook point 84. Keeper 82 is pivoted to lug 21 at 81.

U-shaped hook 75 will be in the full line position shown in FIG. 17 when bag 16 is in the loading position with point 81 engaging keeper 82 and hook 75 is a bag stirrup. Keeper 82 has spring 83 urging keeper 82 into engagement with point 84 of hook 75. When hook 75 is pulled to the unloaded position shown in phantom lines in FIG. 17, top surface 85 of hook 75 is disposed substantially vertically.

Keeper 82 helps retain hook 75 in the stirrup during the bag loading procedure. Cylinders 78 can be operated by compressed air or other suitable fluid or gas connected to fittings 87,89.

Empty open top drum 48 is placed on conveyor 99 as shown in FIG. 1 and moved into a position under drum head adapter 52. Drum head adapter 44 is brought into engagement with the top of the drum. Outer cylinder 52 is then lowered into drum head adapter 44 and bag 60 is inflated.

FIGS. 20, 21 and 22 show a solenoid operated valve reversing circuit familiar to those skilled in the art which can be used to admit air to an air bag.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A container filling machine comprising a frame; hooks on said frame for supporting bar to be filled;

said hooks comprising first support means;

a second support means on said frame for supporting a drum;

filling means on said frame above said bag for filling said bag;

release means on each of said hooks for releasing said bag when the filling of said bar is complete;

said bag has an open mouth and stirrups are attached to said bag around said open mouth;

each said hook being swingably connected to said frame and having an individual actuating member attached thereto;

each said individual actuating member comprises a cylinder having a piston rod connected to each said hook, and each said cylinder being supported on said machine frame;

said hooks being generally U-shaped having a first leg with a first end pivotally attached to said machine frame and said second leg spaced from said first leg and connected to said first leg by an intermediate part;

said hooks being further supported on said frame by traversing means comprising supports slidably supported on said frame;

said filling means comprises a three piece spout;

said spout comprising a first cylindrical member, a second cylindrical member and an intermediate cylindrical member between said first cylindrical member and said second cylindrical member;

said cylindrical members being disposed in concentric relation to one another to feed material to be loaded into said containers and an inflatable seal disposed between said first cylindrical member and said second cylindrical member engaging said cylindrical members whereby a dust tight seal can be created between said inner cylindrical member and said intermediate cylindrical member.

2. The filling machine recited in claim 1 wherein said filling means comprises a flexible section and a pair of actuators attached to said inner cylindrical member and to said machine frame whereby said spout can be moved in engagement with a second container supported on said machine.

3. A filling machine comprising a frame;

vertically spaced vertically extending posts supported on said frame;

a sleeve slidably supported on each said post;

a cross member attached to each said sleeve;

a first arm attached to said cross member and a second arm attached to said cross member spaced from said first arm;

a plurality of loops;

at least one said loop being slidably supported on each said arm;

an air actuated cylinder connected to at least one of said loops and extending to said cross members for moving said loops relative to said posts and a hook supported on each said loop;

each said hook being adapted to engage a stirrup on said bag;

said hook having a generally wedge shaped body having an upper edge, a lower edge, and a base;

said upper edge and said lower edge being connected together at a point;

a first pivot means swingably attaching a first corner of said hook to said machine;

said cylinder having a piston rod connected at a second corner of said body;

said hook being adapted to be received in one of said stirrups.

4. A filler machine having a spout;

support means on said machine for supporting a bag on said machine below said spout;

said support means comprising four spaced hooks;

each said hook being adapted to engage a stirrup on said bag;

each said end part having a generally wedge shaped body having an upper edge, a lower edge, and a base;

said upper edge and said lower edge being connected together at a point;

said upper edge being connected to said lower edge at a first corner by said lower edge which is connected to said base at a second corner;

a first pivot means swingably attaching said first corner of said wedge to said machine;

said cylinder having a piston rod connected at a second corner of said body;

said hook being adapted to be received in a grip of said bag;

four spaced cylinders on said machine;

each said cylinder having a piston rod connected to a leg of said hook adjacent said intermediate part.

5. A container filling machine comprising a frame;

first support means on said frame for supporting a container to be filled;

said supporting means comprising a plurality of individual hooks;

filling means on said frame above said container for filling said container;

said hooks comprising release means on each of said hooks when said filling of said containers are complete;

said hook having a generally wedge shaped body having an upper edge, a lower edge, and a base;

said upper edge and said lower edge being connected together at a point;

said upper edge being connected to said lower edge at a first corner by said lower edge which is connected to said base at a second corner;

a first pivot means swingably attaching said first corner of said wedge to said machine;

said cylinder having a piston rod connected at a second corner of said body;

said hook being adapted to be received in a grip of said bag.

6. A filling machine having a spout;

support means on said machine for supporting a bag below said spout;

said support means comprising four spaced hooks;

each said hook having a rear to front traverse means;

each said hook being adapted to engage a separate stirrup on said bag;

each said hook comprising a leg, an end part and an intermediate part between said leg and said end part;

said hook having a generally wedge shaped body having an upper edge, a lower edge, and a base;

said upper edge and said lower edge being connected together at a point;

said upper edge being connected to said lower edge at a first corner by said lower edge which is connected to said base at a second corner;

a first pivot means swingably attaching said first corner of said wedge to said machine;

said cylinder having a piston rod connected at a second corner of said body;

said hook being adapted to be received in a grip of said bag.

* * * * *